United States Patent [19]
Burkey et al.

[11] Patent Number: 5,665,908
[45] Date of Patent: Sep. 9, 1997

[54] MANUAL TIRE DEFLATING AND PRESSURE INDICATING DEVICE

[76] Inventors: Ronald L. Burkey, 38931 Avenida Arriba; Lee Burkey, 38150 De Portola Rd., both of Temecula, Calif. 92592

[21] Appl. No.: 670,629

[22] Filed: Jun. 26, 1996

[51] Int. Cl.$^6$ ............... B60C 23/02; F16K 15/20
[52] U.S. Cl. ........................... 73/146.8; 137/228
[58] Field of Search .................. 73/146.2, 146.3, 73/146.8; 137/228; 116/34 R, 34 B

[56] References Cited

U.S. PATENT DOCUMENTS

| | | | |
|---|---|---|---|
| 2,320,042 | 5/1943 | McMahan | 152/415 |
| 2,592,759 | 4/1952 | Sullivan | 226/20.8 |
| 2,656,083 | 10/1953 | Blomgren | 226/20.8 |
| 3,429,332 | 2/1969 | Mazeika | 137/227 |
| 3,548,651 | 12/1970 | Itoh | 73/146.8 |
| 3,724,488 | 4/1973 | Featherstone | 137/223 |
| 3,844,530 | 10/1974 | Morrell | 251/149.6 |
| 4,058,009 | 11/1977 | Etter-Felix | 73/146.8 |
| 4,079,691 | 3/1978 | Curado | 73/146.8 |
| 4,276,898 | 7/1981 | Ross | 137/231 |
| 4,445,527 | 5/1984 | Leimbach | 137/226 |
| 4,569,363 | 2/1986 | Kleeman | 137/230 |
| 5,325,886 | 7/1994 | Klink | 137/227 |

*Primary Examiner*—Richard Chilcot
*Assistant Examiner*—William L. Oen
*Attorney, Agent, or Firm*—Gene Scott; Patent Law & Venture Group

[57] ABSTRACT

The described tire deflation device is used when it is necessary to deflate a tire rapidly, especially when the tire is not to be fully deflated. A tool within the device is able to engage the tire valve in order to unscrew it from the valve stem. The tire valve stem is engaged, by a housing wall within which the tool slides. The tool is manipulated at a free proximal end of the housing wall and is able to rotate and slide longitudinally within the housing wall. The tool includes a seal which prevents tire air from reaching an aperture in the housing wall when the tool is at one end of the housing wall, and uncovers the aperture when positioned at the other. In one embodiment, a collar, engagable with a pressure gauge, slides on the outside of the housing wall and is able to be positioned so that the aperture and pressure gauge are interconnected, and alternately positioned to vent the tire. In an alternate embodiment, the gauge is mounted at one end of the tool and interconnected with the valve stem by a channel within the tool.

3 Claims, 3 Drawing Sheets

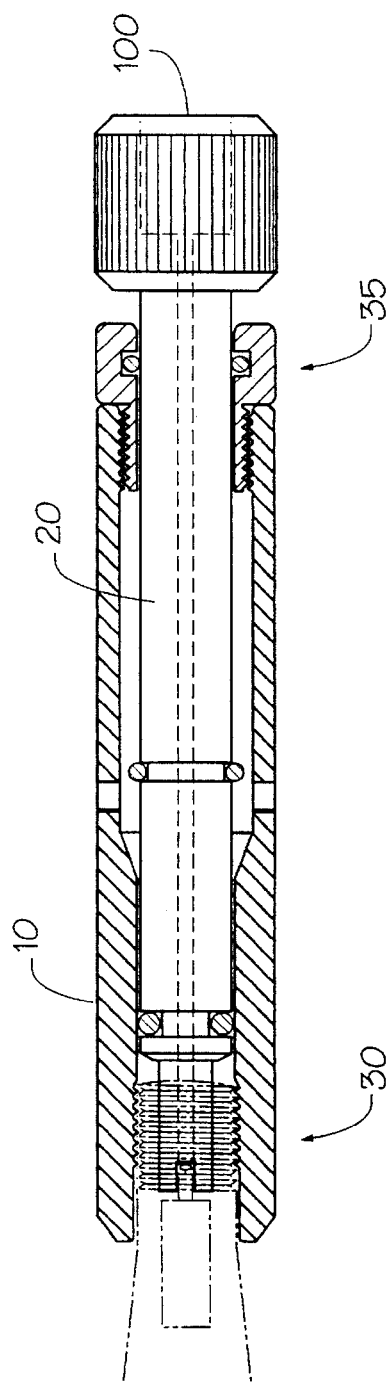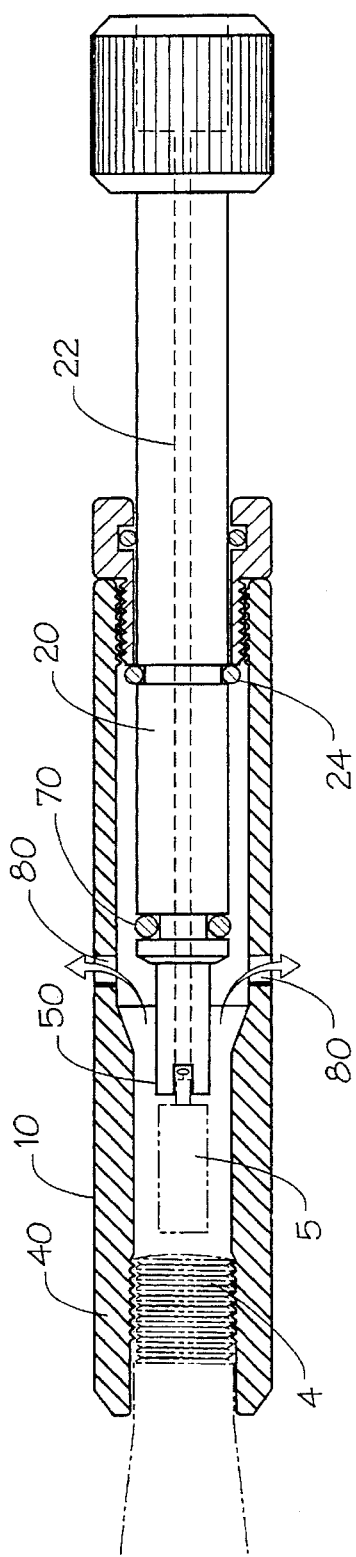

MANUAL TIRE DEFLATING AND PRESSURE INDICATING DEVICE

BACKGROUND OF THE INVENTION

1. Field of the Invention

This invention relates generally to tire deflating devices for removing the air from a tire, and more particularly to such a device for quickly deflating a tire to a lower pressure while providing means for measuring the tire pressure at any point in the deflation process.

2. Description of Related Art

Invention and Use of devices in the field of the invention is known to the public, as they are used for similar purposes as defined herein. The following art appears to be most relevant to the present invention.

McMahan, U.S. Pat. No. 2,320,042, describes a tire filling means for filling a tire with water or other liquids. The device uses a valve core remover held within a tube. The core is removed and translated to one end of the tube. Then a valve is adjusted to inlet the fluid through an inlet port at one side of the tube. When the tire is filled with the fluid, the core is replaced.

Sullivan, U.S. Pat. No. 2,592,759, describes an adapter for use when filling the tubes of vehicle fires with a liquid. A plug cock body has four short pipes integral with it. Two of the pipes are in line and attach to the tube valve stem for air outlet. The other two pipes are in line and at an angle of about 40 degrees to the other pair. These are for attachment to a gauge and to a supply pipe. A hollow plug in the body provides an aperture which may be positioned out of register with all of the pipes when the register is closed. In this position, a valve extractor assembly is connected to the air outlet pipe. When the plug is turned to a second position, the valve extractor stem is pushed through the aperture in the plug and the valve is removed. When the plug is moved to a second position, a predetermined volume of air escapes from the tube. When the plug is mined to a third position water is admired to the tube and a bleeder tube assembly is attached to the air outlet pipe.

Blomgren, U.S. Pat. No. 2,656,083, describes a tire adapter for removing the tire valve for filling the tire. The adapter is of a clear material making it possible to observe the mechanical operation and the passage of a liquid under pressure into a tire. The valve removing means and liquid inlet means are part of the same member and enter the housing through the same opening.

Itoh, U.S. Pat. No. 3,548,651, describes a pocket tire pressure gauge for checking and adjusting tire pressure. It includes a manually adjustable scale-set relief valve in direct communication with a member for connecting to a tire valve. This allows blowing-off of excess pressure in a tire, and optionally provides an air inlet opening also in direct communication with the connecting member, to receive an air hose by means of which a tire can be inflated through the gauge to the required pressure, the air inlet is provided with a shutoff valve, to prevent escape of air through it when an air hose is not connected.

Mazeika, U.S. Pat. No. 3,429,332, describes a replaceable cartridge gauge for use in garages, service stations, and the like, for inflating and deflating vehicle tires, air tanks, and other such pressure vessels and indicating the air pressure within, in which the valve and it associated pressure indicator bar are assembled as a single unit which is removable for replacement or repair purposes as a unit from the valve housing and the barrel of the air extension tube.

Featherstone, U.S. Pat. No. 3,724,488 discloses a combination seal cap and valve for use with a standard pneumatic tire stem valve having an outer sleeve internally threaded at one end for an internal threadable engagement with a standard valve stem and internally threaded at another end for threadably receiving a standard stem valve. A tapered plug member captured within the outer sleeve and dimensioned for sealing the standard valve stem when the outer sleeve is snugly mounted thereto and for allowing an air passage through said sleeve and said standard valve stem into a tire when backed off from a snug installation.

Morrell, U.S. Pat. No. 3,844,530 discloses a flare fitting assembly which is described comprising a pair of flare fittings, at least one of which is threadably fitted with a Schrader-type valve, and a separable Schrader-type valve actuating member. The valve actuating member is provided with a central receiving cup for releasably capturing the end of a valve stem extending from the valve. The actuating member serves to depress the valve stem and open the valve as the fittings are coupled together. The central receiving cup of the member serves to maintain the member axially aligned with respect to the axis of the fittings and releasably retain the member on the stem when the fittings are decoupled.

Ross, U.S. Pat. No. 4,276,989 discloses a delivery system which functions under pump pressure to introduce a fluid such as a sealant interiorly of a pneumatic vessel such as a tire through the air valve without deflating the vessel. A valve core extractor functions in a pressurized atmosphere to remove and retain the valve core without loss of pressure. A pump, including a resilient one-way check valve, introduces the fluid through the valve, also without the loss of pressure. Following introduction of the desired quantity of the fluid, the valve core extractor is functioned in reverse to reinsert the valve core, all without loss of system pressure.

Leimbach, U.S. Pat. No. 4,445,527 discloses a tire valve extension (10) which includes a relief valve element (24) to limit the inflation pressure of the tire. The extension has a tubular body with an annular recess (36) formed therein to define an outer tube section(14) and an inner tube section (16). A spring loaded valve actuating pin (18) is received within the inner tube section, and the relief valve element is received within the recess. Ports (32) formed in the body intersect a channel (38) formed in the recess to define a relief flow path.

Kleeman, U.S. Pat. No. 4,569,363 discloses a hand held mechanism that can be applied to a conventional tire inflation valve on a vehicle tire to facilitate a tire deflation operation. The mechanism includes a rod-like element that automatically engages a tire check valve to open said valve for tire venting purposes. The mechanism also includes a hollow tubular wall structure adapted to receive the sensing head of a conventional pressure gage, whereby the progress of the tire-deflation operation can be ascertained, as necessary to properly terminate the operation at a desired tire pressure. Mechanisms of the described type can be utilized on all wheels of a multi-wheeled vehicle to permit simultaneous deflation of all vehicle tires, thereby greatly reducing the time required to achieve a total tire deflation operation.

Klink, U.S. Pat. No. 5,325,886 discloses an apparatus for inflating a tire, connected to a tire rim, and indicating the pressure of a tire while the tire is on the rim. This apparatus includes an elongated body element for connection with the tire rim, an elongated valve element having indicia thereon slidably disposed within an elongated passageway within the body element, a seal attached to the valve element, and a spring for biasing the valve against movement toward an extended position. The valve is moveable to a fully retracted position within the body and allows pressurized air to flow between the body and the valve when the apparatus is used to fill a tire.

However, the prior art does not teach a means for deflating a tire in an accelerated manner while permitting intermittent determination of the actual pressure level in the tire as it is deflated. The present invention fulfills these needs and provides further related advantages as described in the following summary.

SUMMARY OF THE INVENTION

The present invention teaches certain benefits in construction and use which give rise to the objectives described below. The present invention is a device for quickly deflating a tire. It provides a cylindrical housing encompassing a driver tool which is able to rotate within the housing as well as move longitudinally as well. One end of the tool is configured to engage one end of a tire valve, and the same end of the housing attaches to the valve stem. The tire valve may be rotated to remove it. Then, by withdrawing the tool an annular seal on the tool is moved beyond a vent aperture in the housing so that air in the tire may escape through the vent aperture. In the preferred mode, a collar having a means for attaching a pressure gauge, is slidably mounted on the housing. In one position the collar is positioned to seal the aperture to an attached pressure gauge, while in another position, the collar allows air to vent from the aperture. In this manner a tire may be quickly deflated, with the tire pressure measured at points in the deflation process to assure that too much air is not removed. With this in mind, it is an object of the present invention to provide a tire deflation device that allows the air to be removed from a tire rapidly by removing the tire valve from the tire valve stem. It is a further object to provide in such a device, a means for measuring the remaining tire pressure at any time in the deflation process.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention, a device for rapidly deflating a tire to a lower pressure. In such drawings:

FIGS. 8 and 9 are longitudinal cross-sectional views of the embodiment of FIGS. 3 and 4 respectively.

DETAILED DESCRIPTION OF THE PREFERRED EMBODIMENT

Figure 1:
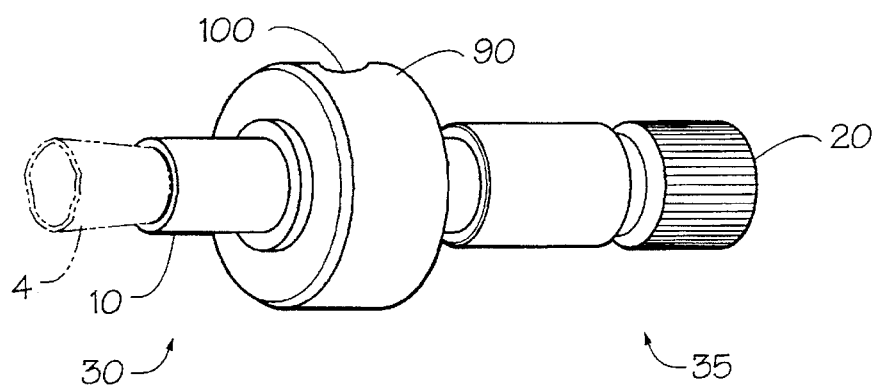
FIG. 1 is a perspective view of a first preferred embodiment of the present invention showing a tool of the invention fully engaged within a housing wall of the invention.
Figure 2:
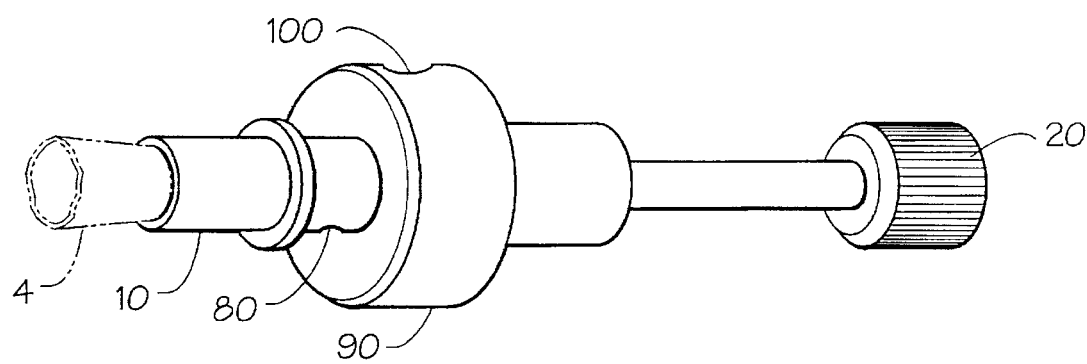
FIG. 2 is a perspective view thereof showing the tool of the invention partially withdrawn from the housing wall of the invention.
Figure 3:
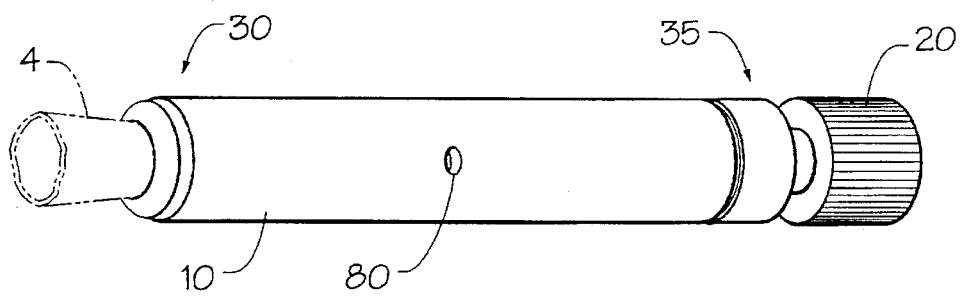
FIG. 3 is a perspective view of a second preferred embodiment of the present invention showing the tool of the invention fully engaged within the housing wall of the invention.
Figure 4:
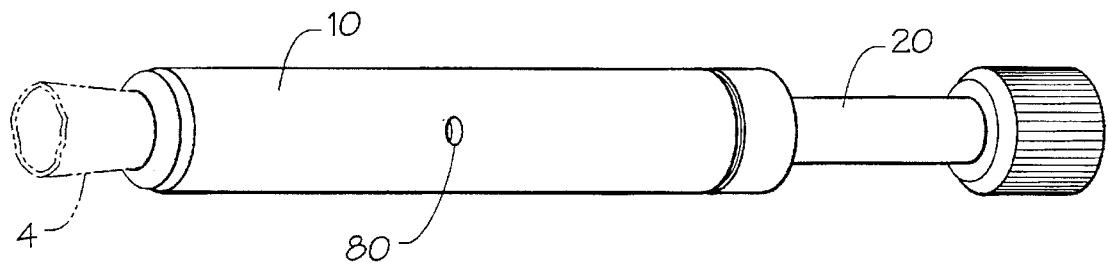
FIG. 4 is a perspective view thereof showing the tool of the invention partially withdrawn from the housing wall of the invention.
Figure 5:
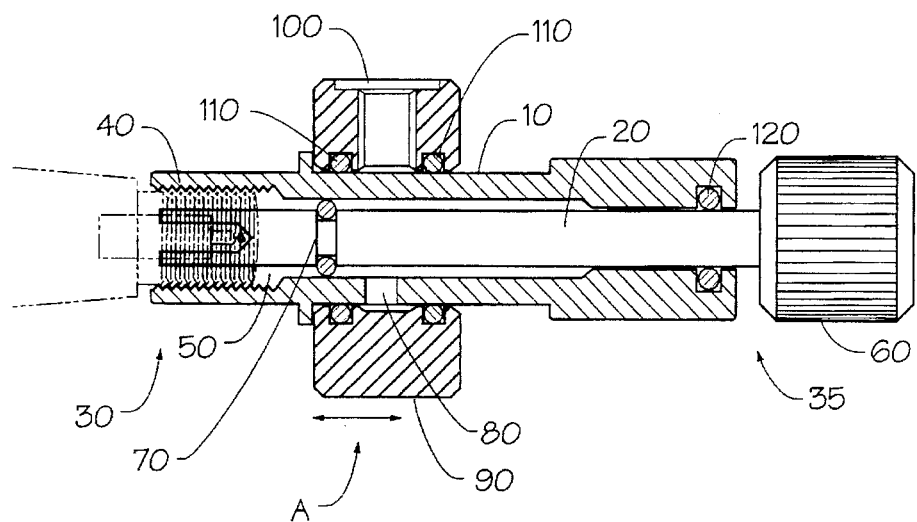
FIG. 5 is a longitudinal cross-sectional view of the embodiment of FIG. 1.
Figure 6:
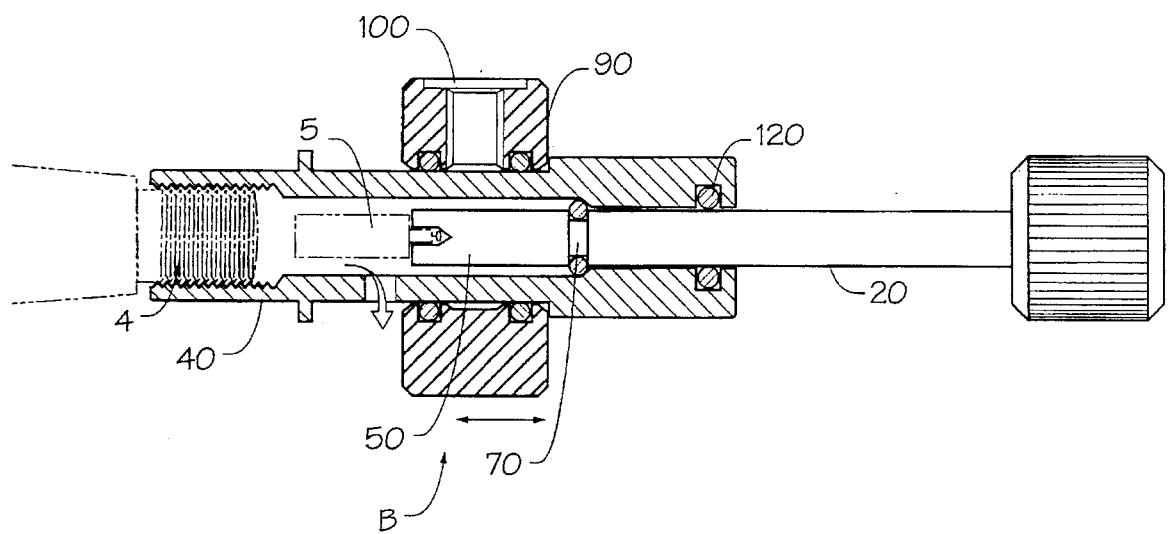
FIGS 6 and 7 are longitudinal cross-sectional views of the embodiment of FIG. 2 showing a collar of the invention in two alternate positions, in FIG. 6, the collar is pulled back to release air from the aperture of the invention, and in FIG. 7, the collar is pushed forward to seal the aperture to a pressure gauge engagement means.
Figure 7:
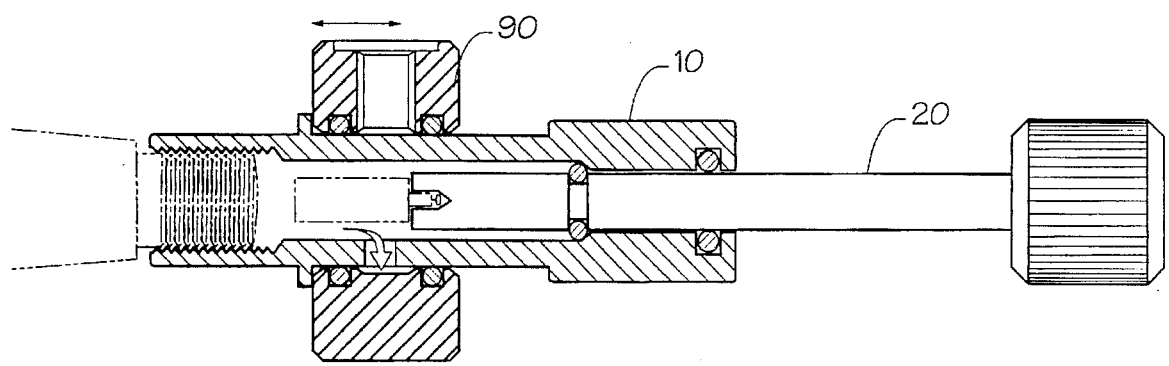

The above described drawing figures illustrate the invention, a tire deflating device for use with a tire valve-stem 4 and a tire valve 5 as well as an air pressure gauge (not shown). In a first embodiment of the device, shown in FIGS. 1, 2, 5, 6, and 7, the device includes a cylindrical housing wall 10 encompassing, in sliding engagement, an elongate tool 20. The housing wail 10 and the elongate tool 20 have, at a distal end 30 of the device, a means for engaging a tire valve stem 40, preferably an internal thread matching the external thread found on the stem of a tire valve, as best seen in FIGS. 5–7, and a means for engaging a tire valve 50, preferably a slotted driver as best seen in FIGS. 6 and 7, respectively. The elongate tool 20 further provides a means for moving the elongate tool longitudinally 60 within the housing wail 10, preferably a knurled knob, thereby positioning a means for aperture sealing 70, preferably an o-ring seal, selectively, distally or proximally about an aperture means 80, preferably one or more holes in the housing wail 10.

With the means for engaging a tire valve stem 40 and the means for engaging a tire valve 50, engaged with the tire valve stem 4 and tire valve 5 respectively, the aperture sealing means 70 is distally positioned about the aperture means 80, as best shown in FIGS. 5, and 8, and air from the tire (not shown) is not in communication with the aperture means 80. Rotation of the elongate tool 20 within the housing wail 10 removes the tire valve 5 from the tire valve stem 4 by disengaging the respective threads.

With the tire valve 5 removed from the stem 4, the elongate tool 20 is moved longitudinally within the housing wail 10, away from the tire valve stem 4. This positions the sealing means 70 proximally about the aperture means 80, so that air from the tire is now in communication with the aperture means 80 and is able to escape.

In a preferred embodiment of the present invention, as best shown in FIGS. 1, 2, 5, 6, and 7 a sliding annular collar 90 is positioned about the housing wall 10. The collar 90 provides a means for mounting a pressure gauge 100, such as a threaded fitting or compression fitting. The pressure gauge itself is not shown in the figures, and is not considered to be a part of the invention. Also, the collar 90 provides a pair of spaced apart sliding aperture seals 110, preferably o-rings. The collar 90 is positionable (position "A") as shown in FIGS. 1, 2, 5, and 7, on the housing wail 10 so that the spaced apart aperture seals 110 straddle the aperture means 80 thereby sealing the aperture means 80 to the pressure gauge engaging means 100 for enabling the measuring of the air pressure in the tire by an attached pressure gauge. The collar 90 is further positionable (position "B") as shown in FIG. 6, to vent the aperture means 80 for bleeding air from the tire. The positioning .of the collar 90 as well as the elongate tool 20 is easily completed manually. An additional shaft seal 120 may be used at the proximal end 35 of the device to assure proper sealing of the tool 20 within the housing wall 10.

FIGS. 3, 4, 8, and 9 show another embodiment of the invention where collar 90 is not included. In this version, the means for mounting the air pressure gauge 100 is positioned at the proximal end 35 of the elongate tool 20 and an internal channel 22 extends from the means for engaging the valve of the tire 50 to the means for mounting the air pressure gauge 100, so that tire air pressure is always in communication with the means for mounting the air pressure gauge 100. FIGS. 8 and 9 show the tool 20 preferably includes a snap ring 24 for preventing tool 20 from being forced out of housing wall 10 under the force air pressure from the tire.

While the invention has been described with reference to the described embodiments, it is to be clearly understood by those skilled in the art that the invention is not limited thereto. Rather, the scope of the invention is to be interpreted only in conjunction with the appended claims.

What is claimed is:

1. A tire deflating device for use with a tire having a valve stem incorporating a valve, and an air pressure gauge, the tire deflating device comprising:

a cylindrical housing wall providing at one end thereof, a means for engaging the valve stem for sealingly joining the housing wall with the valve stem;

an elongate tool slidably and rotatably engaged within the cylindrical housing and providing, at a distal end thereof, adjacent to the one end of the cylindrical housing, a means for engaging the tire valve so as to be able to rotate said valve for removal thereof, and at a proximal end thereof, extending out from the cylindrical housing, a means for manually grasping, rotating and longitudinally sliding the elongate tool within the housing wall;

a movable means for engaging the air pressure gauge for, in a manually selected position of the engaging means, sealing the gauge in communication with the valve stem and in an alternate manually selected position of the engaging means, uncovering an aperture means in the housing wall for bleeding air from the tire, the movable means for engaging being manually movable between the selected position and the alternate manually selected position until the tire is deflated to a desired extent.

2. The device of claim 1 wherein the gauge engaging means is an annular collar positioned coaxially about the housing wall and slidable thereon.

3. The device of claim 1 wherein the elongate tool further includes a longitudinal internal channel communicating between the means for engaging the valve of the tire and the engaging means.

* * * * *